United States Patent
Yamamoto et al.

(10) Patent No.: US 11,862,014 B2
(45) Date of Patent: Jan. 2, 2024

(54) MAGNETIC MARKER SYSTEM

(71) Applicant: AICHI STEEL CORPORATION, Tokai (JP)

(72) Inventors: Michiharu Yamamoto, Tokai (JP); Tomohiko Nagao, Tokai (JP); Hitoshi Aoyama, Tokai (JP)

(73) Assignee: AICHI STEEL CORPORATION, Tokai (JP)

( * ) Notice: Subject to any disclaimer, the term of this patent is extended or adjusted under 35 U.S.C. 154(b) by 267 days.

(21) Appl. No.: 17/414,354

(22) PCT Filed: Dec. 27, 2019

(86) PCT No.: PCT/JP2019/051528
§ 371 (c)(1),
(2) Date: Jun. 16, 2021

(87) PCT Pub. No.: WO2020/138460
PCT Pub. Date: Jul. 2, 2020

(65) Prior Publication Data
US 2022/0028261 A1    Jan. 27, 2022

(30) Foreign Application Priority Data
Dec. 28, 2018 (JP) .................. 2018-248432

(51) Int. Cl.
*G08G 1/042* (2006.01)
*G06Q 10/20* (2023.01)
*G08G 1/01* (2006.01)

(52) U.S. Cl.
CPC ............. *G08G 1/042* (2013.01); *G06Q 10/20* (2013.01); *G08G 1/0116* (2013.01); *G08G 1/0129* (2013.01)

(58) Field of Classification Search
CPC .... G08G 1/042; G08G 1/0116; G08G 1/0129; G06Q 10/20; E01F 11/00; G05D 1/0261; G05D 2201/0213; G01V 3/08
See application file for complete search history.

(56) References Cited

U.S. PATENT DOCUMENTS 6,122,573 A * 9/2000 Higashi ............ G08G 1/096725
                                                180/167
9,720,411 B2 * 8/2017 Crombez ............. G05D 1/0246
(Continued)

FOREIGN PATENT DOCUMENTS

JP    10-198887 A     7/1998
JP    2003-331400 A   11/2003
(Continued)

OTHER PUBLICATIONS

International Search Report for corresponding Application No. PCT/JP2019/051528, dated Feb. 18, 2020.

*Primary Examiner* — Mohamed Barakat
*Assistant Examiner* — Rufus C Point
(74) *Attorney, Agent, or Firm* — Renner, Otto, Boisselle & Sklar, LLP

(57) ABSTRACT

In a magnetic marker system including a magnetic marker disposed in a travel environment so as to be detectable by a magnetic sensor attached to a vehicle and a server apparatus which acquires detection information of the magnetic marker from each vehicle, the detection information uploaded from a vehicle side to the server apparatus includes marker information, which is identification information of a corresponding magnetic marker, and the server apparatus estimates the state of the magnetic marker based on the detection information from each vehicle.

17 Claims, 21 Drawing Sheets

| MARKER ID | MARKER-DETECTED COUNT |
|---|---|
| M3A32K | 102 |
| M2K70H | 103 |
| M5S91Y | 56 |
| M1R22N | 5 |
| M8L15G | 113 |
| M1S22W | 112 |
| M8B05H | 67 |
| . | . |
| . | . |

OPERATION DATA (MAGNETIC MARKERS)
ROAD TYPE 1 OCTOBER 26 / ROAD TYPE 1 OCTOBER 27 / ROAD TYPE 1 OCTOBER 28

(56) References Cited

U.S. PATENT DOCUMENTS

| | | | | |
|---|---|---|---|---|
| 9,959,754 B1* | 5/2018 | King | ............... | G08G 1/0133 |
| 11,151,339 B2* | 10/2021 | Kovarik | ............... | G05D 1/0261 |
| 11,164,217 B2* | 11/2021 | Yamamoto | ............... | G08G 1/02 |
| 11,631,111 B2* | 4/2023 | Yamamoto | ............... | G06Q 20/308 |
| | | | | 705/14.69 |
| 2010/0274448 A1* | 10/2010 | Ueno | ............... | G01C 21/005 |
| | | | | 701/36 |
| 2015/0241878 A1* | 8/2015 | Crombez | ............... | G05D 1/0246 |
| | | | | 701/23 |
| 2015/0247719 A1* | 9/2015 | Huang | ............... | B62D 15/025 |
| | | | | 701/41 |
| 2018/0283904 A1* | 10/2018 | Yamamoto | ............... | G05D 1/02 |
| 2019/0098468 A1* | 3/2019 | Yamamoto | ............... | G01C 21/26 |
| 2019/0155305 A1 | 5/2019 | Aoyama | | |
| 2019/0196496 A1* | 6/2019 | Yamamoto | ............... | G05D 1/0259 |
| 2020/0012294 A1* | 1/2020 | Yamamoto | ............... | G05D 1/0261 |
| 2020/0110420 A1 | 4/2020 | Yamamoto et al. | | |
| 2021/0081624 A1* | 3/2021 | Kovarik | ............... | E01F 9/578 |
| 2021/0150205 A1* | 5/2021 | Snyder | ............... | G06V 20/80 |
| 2021/0340715 A1* | 11/2021 | Yamamoto | ............... | G08G 1/167 |

FOREIGN PATENT DOCUMENTS

| | | | | |
|---|---|---|---|---|
| JP | 2004-347443 A | 12/2004 | | |
| JP | 2005-202478 A | 7/2005 | | |
| JP | 2006-236282 A | 9/2006 | | |
| JP | 2007-132689 A | 5/2007 | | |
| JP | 2007-303950 A | 11/2007 | | |
| JP | 2015-184243 A | 10/2015 | | |
| WO | 2017/187879 A | 11/2017 | | |
| WO | WO-2017187881 A1 * | 11/2017 | ............... | E01F 11/00 |
| WO | 2018/225677 A1 | 12/2018 | | |
| WO | WO-2018225677 A1 * | 12/2018 | ............... | E01F 11/00 |

\* cited by examiner

[FIG.1]
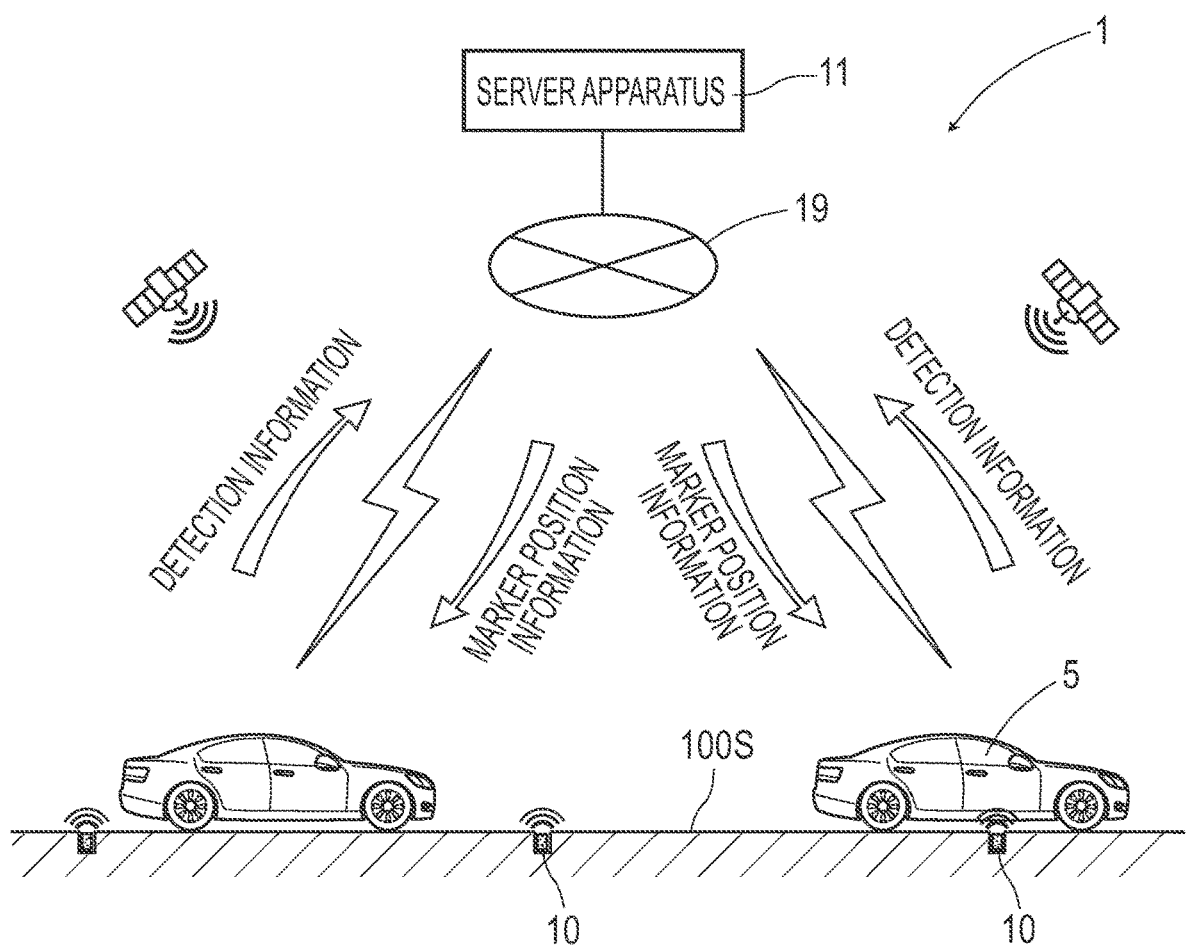

[FIG.2]
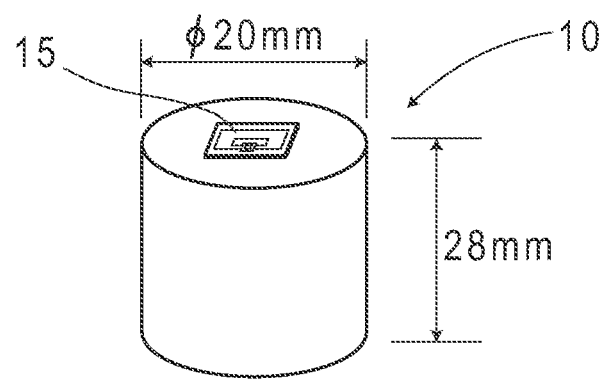

[FIG.3]
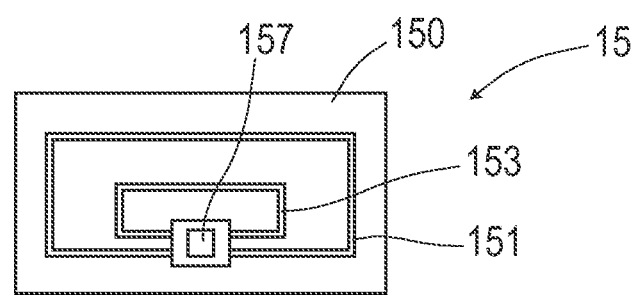

[FIG.4]
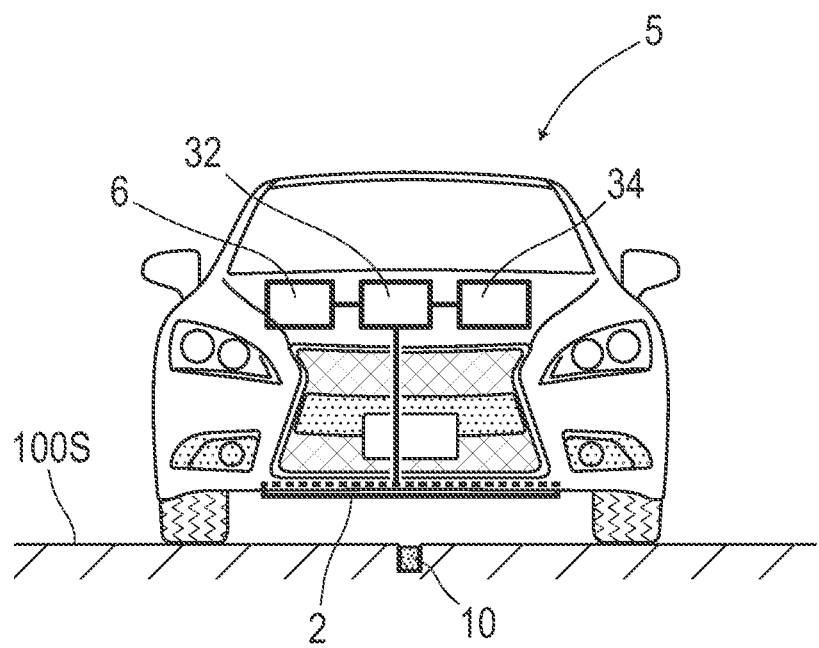

[FIG.5]
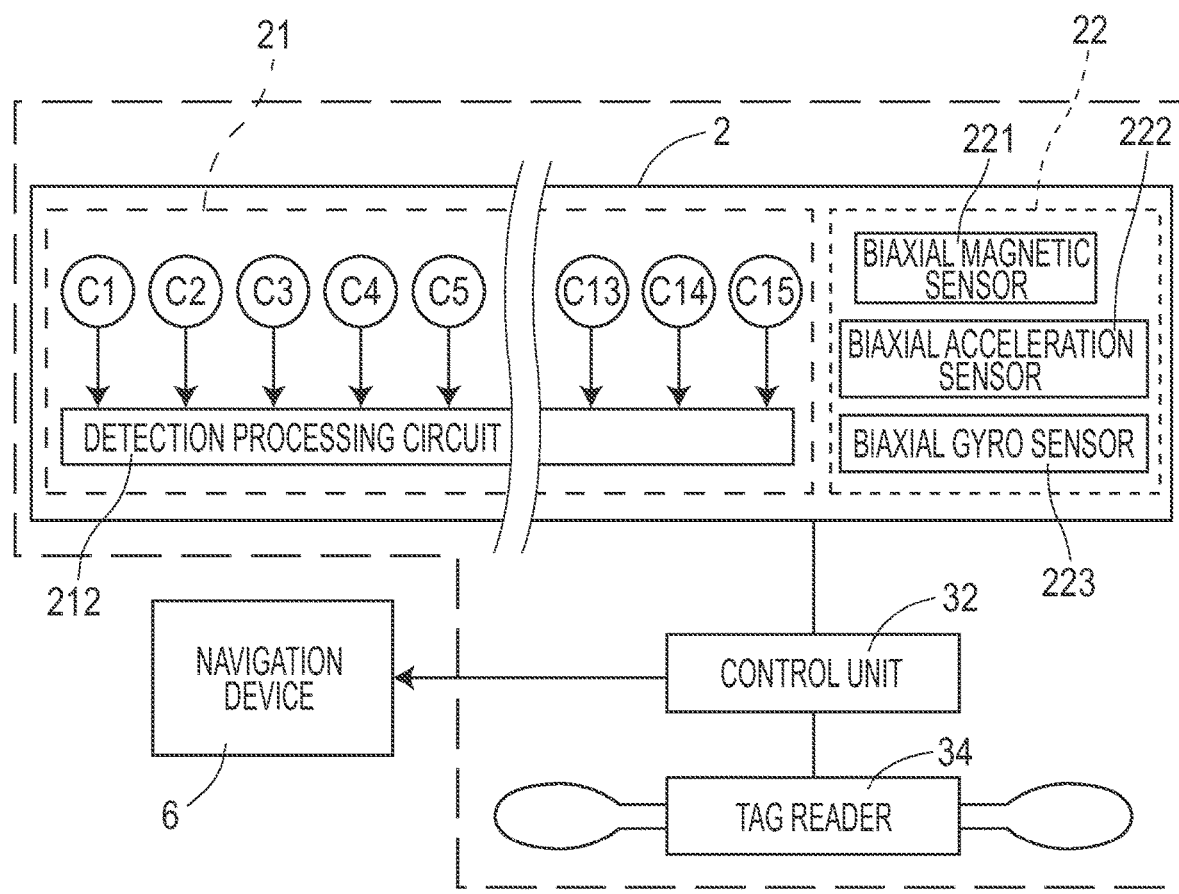

[FIG.6]
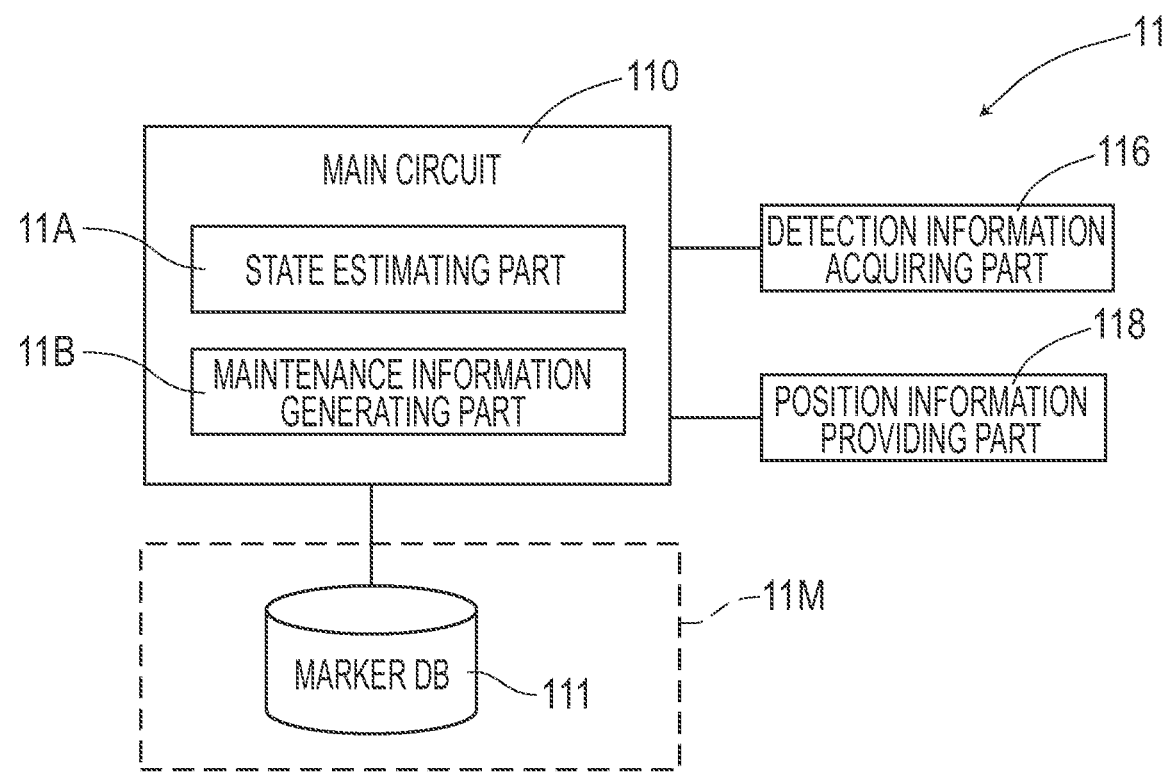

[FIG.7]

INSTALLATION DATA

| MARKER ID | MARKER POSITION DATA | ROAD TYPE |
|---|---|---|
| M3A32K | 35.3012/135.2513 | 1 |
| M2K70H | 35.2513/135.2614 | 2 |
| M5S91Y | 35.2515/135.2618 | 1 |
| M1R22N | 35.2410/135.2312 | 1 |
| M8L15G | 35.2426/135.2332 | 2 |
| M1S22W | 35.2328/135.2311 | 3 |
| M8B05H | 35.2433/135.2303 | 4 |
| ⋮ | ⋮ | ⋮ |

[FIG.8]

OPERATION DATA (MAGNETIC MARKERS)

ROAD TYPE 1 OCTOBER 28
ROAD TYPE 1 OCTOBER 27
ROAD TYPE 1 OCTOBER 26

| MARKER ID | MARKER-DETECTED COUNT |
|---|---|
| M3A32K | 102 |
| M2K70H | 103 |
| M5S91Y | 56 |
| M1R22N | 5 |
| M8L15G | 113 |
| M1S22W | 112 |
| M8B05H | 67 |
| ... | ... |

[FIG.9]

STATE DATA (MAGNETIC MARKERS)

| MARKER ID | QUALITY (MAINTENANCE INFORMATION) |
|---|---|
| M3A32K | ○ |
| M2K70H | ○ |
| M5S91Y | △ |
| M1R22N | × |
| M8L15G | ○ |
| M1S22W | ○ |
| M8B05H | △ |
| ⋮ | ⋮ |

[FIG.10]
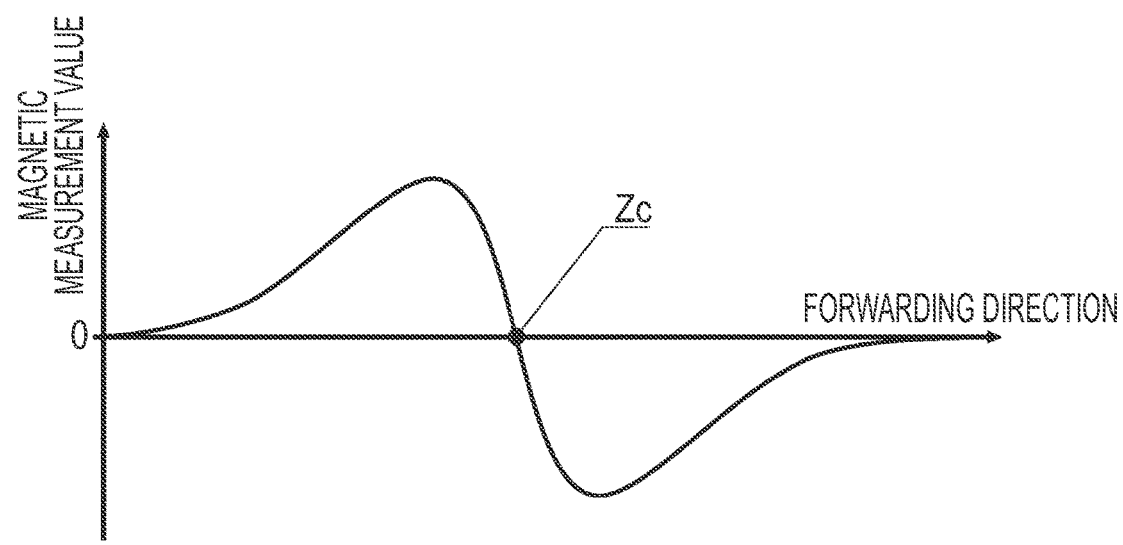

[FIG.11]
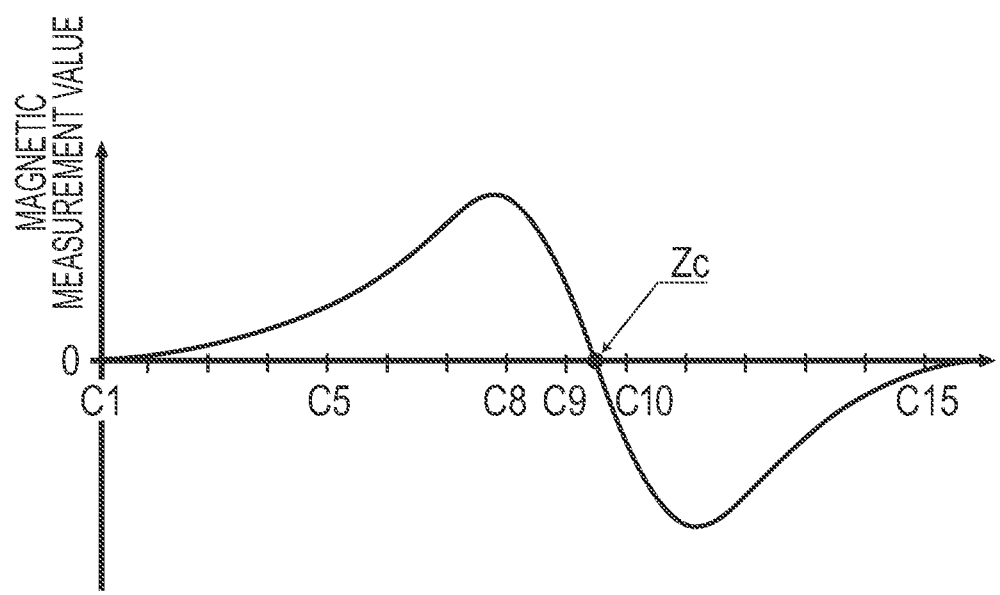

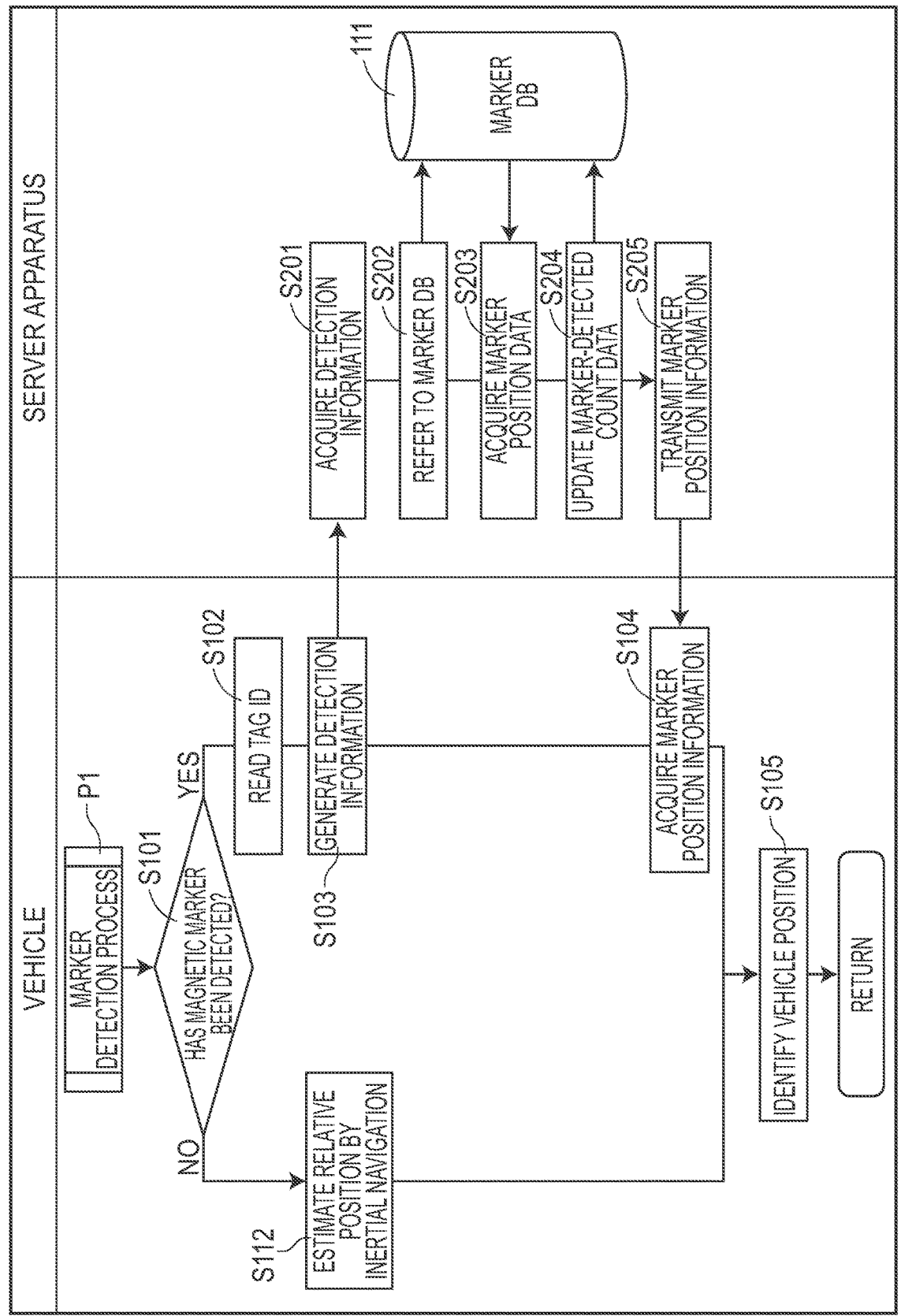
[FIG.12]

[FIG.13]
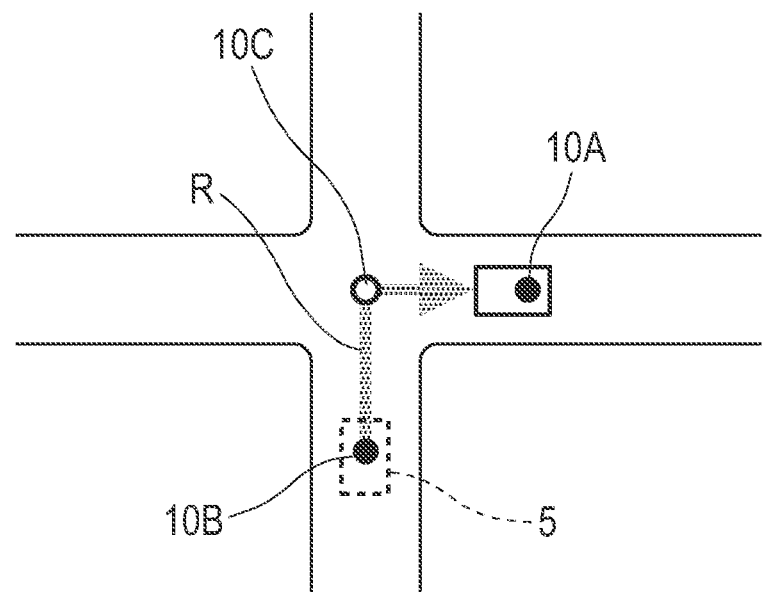

[FIG.14]

OPERATION DATA (MAGNETIC MARKERS)

| MARKER ID | PASSING COUNT | MARKER-DETECTED COUNT | MARKER-DETECTED RATIO |
|---|---|---|---|
| M3A32K | 108 | 102 | 94.4% |
| M2K70H | 115 | 103 | 89.6% |
| M5S91Y | 123 | 105 | 85.4% |
| M1022W | 53 | 6 | 11.3% |
| M8115G | 65 | 42 | 64.6% |
| ⋮ | ⋮ | ⋮ | ⋮ |

[FIG.15]
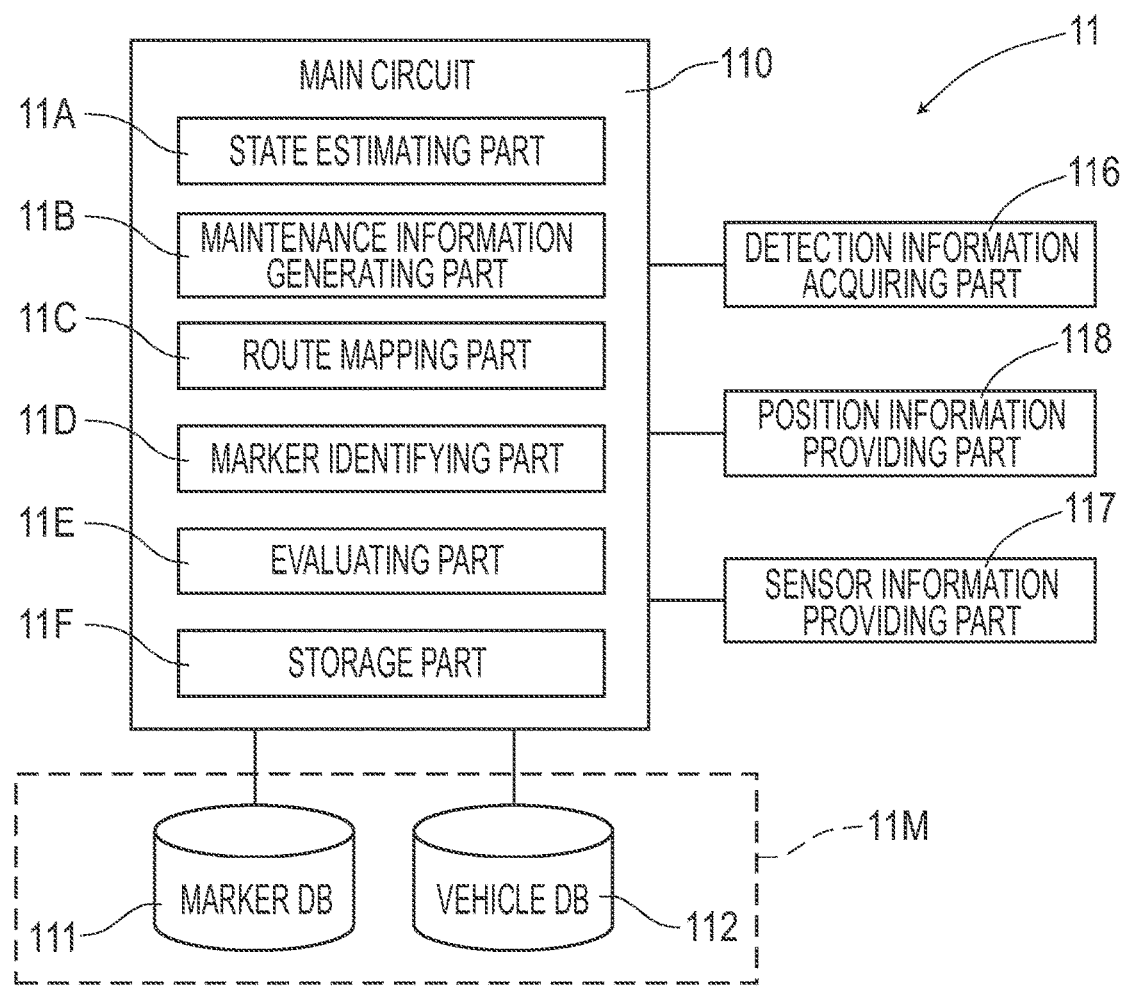

[FIG.16]
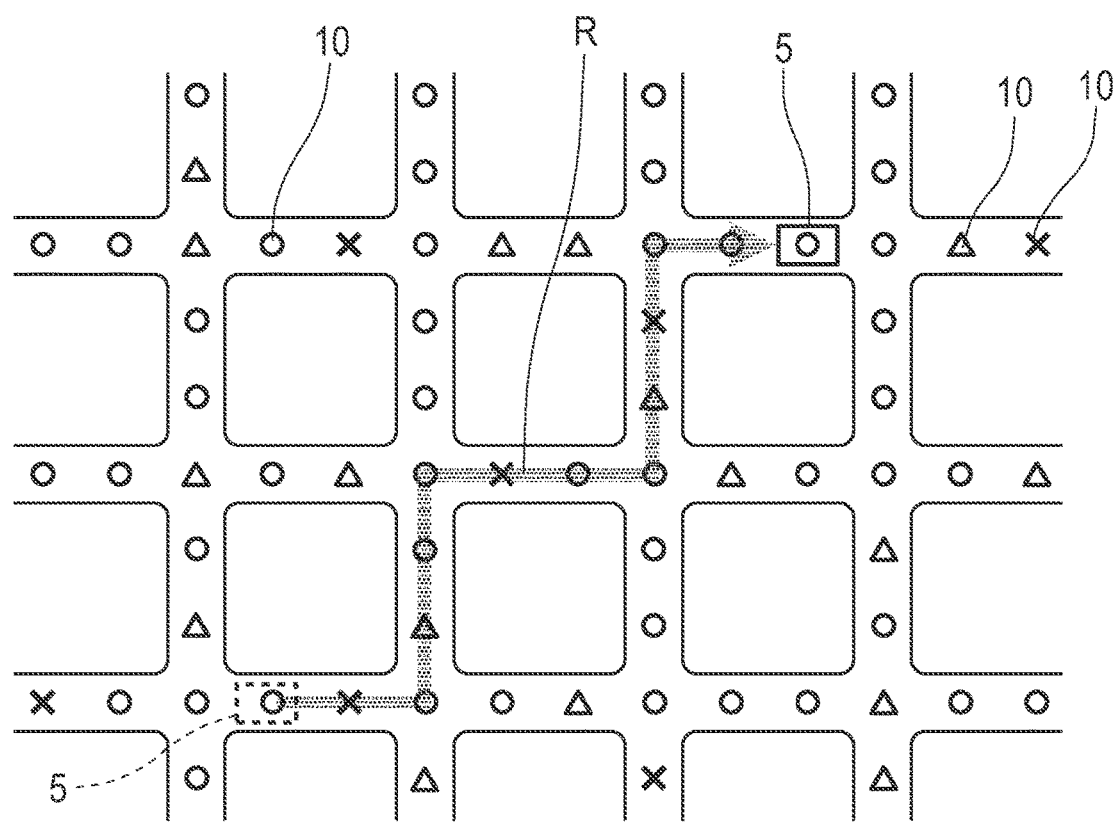

[FIG.17]

OPERATION DATA (SENSOR ARRAY)

| VEHICLE ID | MAGNETIC MARKER WITH QUALITY LEVEL ○ | | | MAGNETIC MARKER WITH QUALITY LEVEL △ | | | MAGNETIC MARKER WITH QUALITY LEVEL × | | |
|---|---|---|---|---|---|---|---|---|---|
| | PASSING COUNT | DETECTION COUNT | DETECTION RATIO (%) | PASSING COUNT | DETECTION COUNT | DETECTION RATIO (%) | PASSING COUNT | DETECTION COUNT | DETECTION RATIO (%) |
| C52098 | 65 | 62 | 95.4 | 34 | 25 | 73.5 | 6 | 2 | 33.3 |
| C04271 | 135 | 130 | 96.3 | 62 | 42 | 67.7 | 13 | 4 | 30.8 |
| C03048 | 82 | 75 | 91.5 | 42 | 29 | 69.0 | 9 | 3 | 33.3 |
| C89230 | 157 | 145 | 92.4 | 72 | 49 | 68.1 | 15 | 2 | 13.3 |
| C73256 | 186 | 183 | 98.4 | 92 | 75 | 81.5 | 18 | 4 | 22.2 |
| ⋮ | ⋮ | ⋮ | ⋮ | ⋮ | ⋮ | ⋮ | ⋮ | ⋮ | ⋮ |

[FIG.18]

STATE DATA (SENSOR ARRAY)

| VEHICLE ID | WHETHER INSPECTION IS REQUIRED |
|---|---|
| C52098 | NOT REQUIRED |
| C04271 | NOT REQUIRED |
| C03048 | NOT REQUIRED |
| C89230 | REQUIRED |
| C73256 | NOT REQUIRED |
| ⋮ | ⋮ |

[FIG.19]
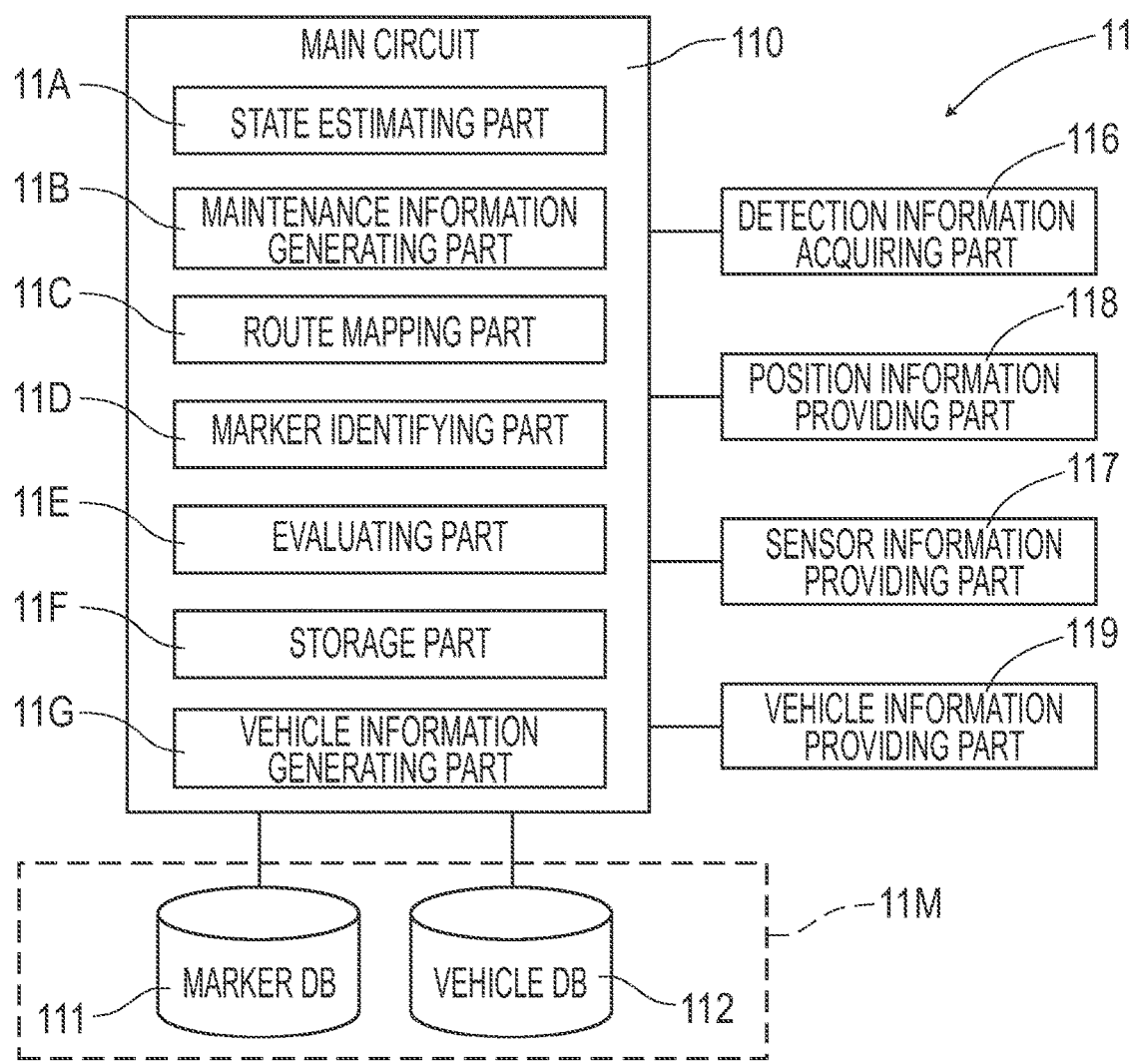

[FIG.20]

STATE DATA (MAGNETIC MARKERS)

| MARKER ID | QUALITY (MAINTENANCE INFORMATION) | MAGNETIC LEVEL |
|---|---|---|
| M3A32K | ○ | 10 |
| M2K70H | ○ | 5 |
| M5S91Y | △ | — |
| M1R22N | × | 8 |
| M8L15G | ○ | 7 |
| M1S22W | ○ | 8 |
| M8B05H | △ | 4 |
| ⋮ | ⋮ | ⋮ |

[FIG.21]
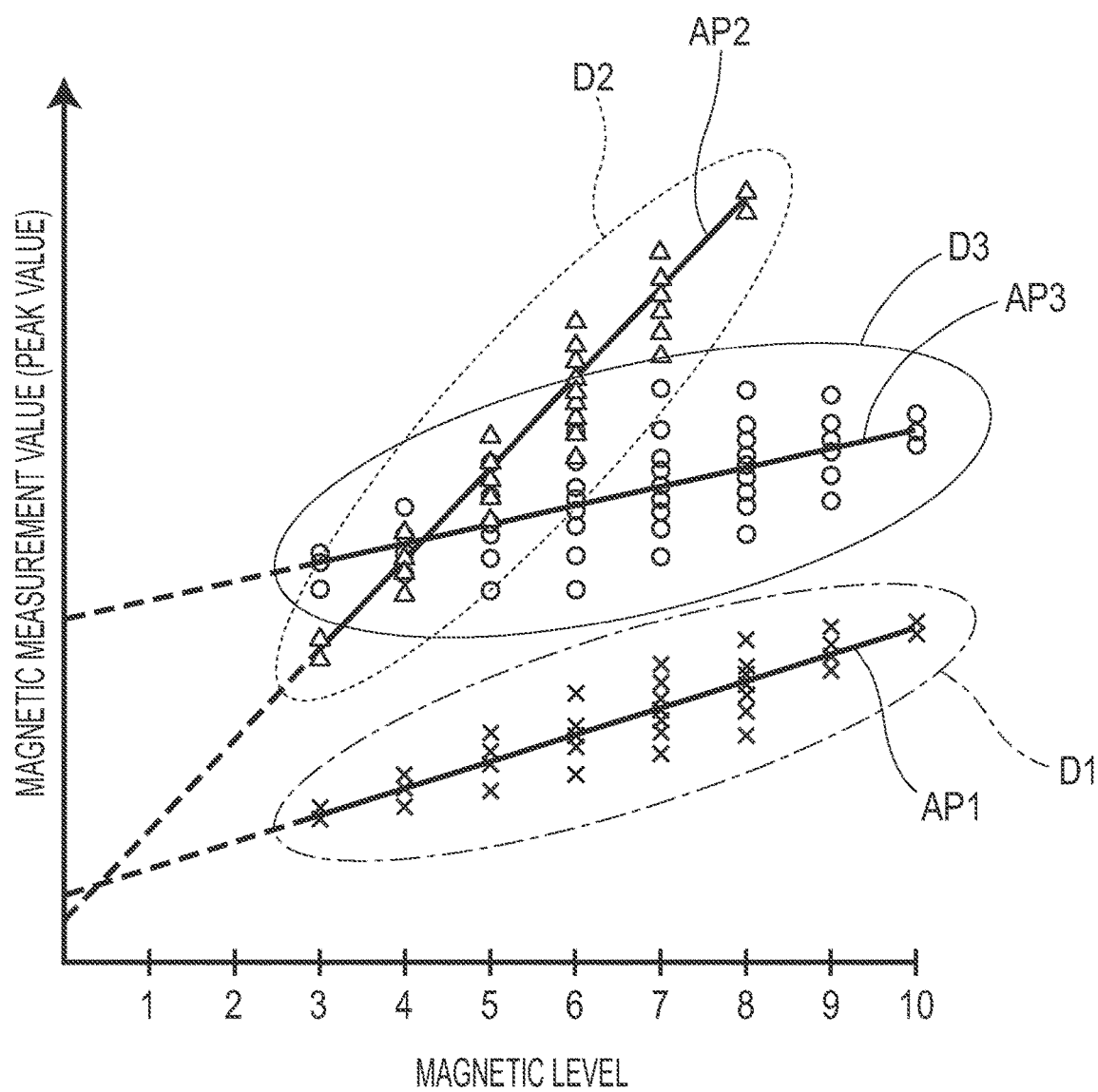

MAGNETIC MARKER SYSTEM

TECHNICAL FIELD

The present invention relates to a magnetic marker system including a magnetic marker laid so as to be detectable on a vehicle side.

BACKGROUND ART

Conventionally, magnetic marker systems for vehicles using magnetic markers laid in a road have been known (for example, refer to Patent Literature 1). This magnetic marker system has an object of providing, by taking a vehicle with a magnetic sensor attached to a floor of the vehicle's body as a target, various driving assists using the magnetic markers laid along a lane, such as automatic steering control and lane departure warning.

CITATION LIST

Patent Literature

Patent Literature 1: Japanese Unexamined Patent Application Publication No. 2005-202478

SUMMARY OF INVENTION

Technical Problem

However, the above-described conventional system has the following problem. That is, regular inspection work and maintenance work are required in order to enable avoidance of a trouble that can happen in the magnetic markers, the magnetic sensor, or the like before it happens, quick handling after the trouble occurs, and so forth, thereby raising a possibility of increasing management cost.

The present invention was made in view of the above-described conventional problem, and is to provide a magnetic marker system that is useful in inspecting and maintaining a magnetic marker or a magnetic sensor.

Solution to Problem

The present invention resides in a magnetic marker system including a magnetic marker disposed in a traveling road so as to be detectable by a magnetic detecting part attached to a vehicle, the system including:

vehicles each of which outputs, when detecting the magnetic marker, detection information including marker identifying information capable of uniquely identifying the magnetic marker; and a server apparatus which acquires the detection information outputted from each of the vehicles, wherein the server apparatus includes a state estimating part which estimates a state of at least one of the magnetic marker and the magnetic detecting part based on the detection information from the each of the vehicles.

Advantageous Effects of Invention

According to the magnetic marker system of the present invention, by using the detection information of the magnetic marker from each vehicle, the state of at least one of the magnetic marker and the magnetic detecting part can be efficiently estimated. With use of the state estimated by the magnetic marker system of the present invention, inspection and maintenance of the magnetic marker or the magnetic sensor can be efficiently performed, and management cost can be suppressed.

BRIEF DESCRIPTION OF DRAWINGS

FIG. 1 is a configuration diagram of a magnetic marker system in a first embodiment.

FIG. 2 is a perspective view depicting a magnetic marker in the first embodiment.

FIG. 3 is a front view of an RFID tag in the first embodiment.

FIG. 4 is a descriptive diagram depicting a state in which a vehicle detects the magnetic marker in the first embodiment.

FIG. 5 is a block diagram depicting a configuration on a vehicle side in the first embodiment.

FIG. 6 is a block diagram depicting a configuration of a server apparatus in the first embodiment.

FIG. 7 is a descriptive diagram of installation data of magnetic markers in the first embodiment.

FIG. 8 is a descriptive diagram of operation data of the magnetic markers in the first embodiment.

FIG. 9 is a descriptive diagram of state data of the magnetic markers in the first embodiment.

FIG. 10 is a descriptive diagram exemplarily depicting changes of a magnetic measurement value in a forwarding direction at the time of passing over the magnetic marker in the first embodiment.

FIG. 11 is a descriptive diagram exemplarily depicting a distribution curve of magnetic measurement values in a vehicle-width direction by magnetic sensors Cn arrayed in the vehicle-width direction in the first embodiment.

FIG. 12 is a flow diagram depicting a flow of operation of the magnetic marker system in the first embodiment.

FIG. 13 is a descriptive diagram of a method of identifying an undetected marker in the first embodiment.

FIG. 14 is a descriptive diagram depicting another example of the operation data of the magnetic markers in the first embodiment.

FIG. 15 is a block diagram depicting a configuration of a server apparatus in a second embodiment.

FIG. 16 is a descriptive diagram exemplarily depicting an electronic map mapped with magnetic markers and a vehicle's route R in the second embodiment.

FIG. 17 is a descriptive diagram of operation data of a sensor array in the second embodiment.

FIG. 18 is a descriptive diagram of state data of the sensor array in the second embodiment.

FIG. 19 is a block diagram depicting a configuration of a server apparatus in a third embodiment.

FIG. 20 is a descriptive diagram of state data of magnetic markers in the third embodiment.

FIG. 21 is a graph depicting a correlation between a magnetic level of a magnetic marker and a magnetic measurement value (peak value) from a magnetic sensor in the third embodiment.

DESCRIPTION OF EMBODIMENTS

Modes for implementation of the present invention are specifically described by using the following embodiments.

First Embodiment

The present embodiment is an example regarding magnetic marker system 1 including a function of estimating the state of magnetic marker 10. Server apparatus 11 configuring this magnetic marker system 1 uses detection information of magnetic marker 10 acquired from each vehicle 5 and estimates the state of magnetic marker 10. Details of this are described by using FIG. 1 to FIG. 14.

Magnetic marker system 1 is configured of, as in FIG. 1, a combination of vehicles 5 connectable to a public communication line such as Internet 19 and server apparatus 11 which acquires detection information of magnetic marker 10 from each vehicle 5. This magnetic marker system 1 is operated by taking a road where magnetic markers 10 which each integrally hold RFID (Radio Frequency IDentification) tag 15 (FIG. 2) are laid as a target.

In the following, after (1) magnetic marker 10 is generally described, (2) vehicle 5 and (3) server apparatus 11 configuring magnetic marker system 1 are described, and then details of operation of (4) magnetic marker system 1 are described.

(1) Magnetic Marker

Magnetic marker 10 is a road marker including, as in FIG. 2, a columnar-shaped magnet having a diameter of 20 mm and a height of 28 mm and having RFID tag 15 attached to its end face. This magnetic marker 10 is laid as, for example, being accommodated in a hole bored into a road surface. Magnetic markers 10 are arrayed, for example, at intervals of 10 meters along the center of a lane (one example of a traveling road) sectioned by left and right lane marks.

In magnetic marker 10, as in FIG. 2, sheet-shaped RFID tag 15 is disposed as being laminated to the end face serving as an upper surface at the time of laying. RFID tag 15, which is one example of a wireless tag, operates by wireless external power feeding, and externally outputs, by wireless communication, a tag ID as identification information, which is one example of marker identifying information. Note that information indicating a laying position of the magnetic marker may be adopted as marker identifying information to be outputted from RFID tag 15.

RFID tag 15 is, as in FIG. 3, an electronic component having IC chip 157 implemented on a surface of tag sheet 150 cut out from, for example, a PET (PolyEthylene terephthalate) film. On the surface of tag sheet 150, a printed pattern of loop coil 151 and antenna 153 is provided. Loop coil 151 is a receiving coil where an exciting current is generated by external electromagnetic induction. Antenna 153 is a transmission antenna for wireless transmission of position data and so forth.

(2) Vehicle

Vehicle 5 includes, as in FIG. 4, measuring unit 2, tag reader 34, control unit 32, and a communication unit (omitted in the drawing) including a wireless communication function. Furthermore, vehicle 5 includes navigation device 6 which performs route guidance to a destination. Vehicle 5 can be connected to the public communication line via the communication unit. Vehicle 5 transmits and receives information such as detection information and marker position information of magnetic markers 10 to and from server apparatus 11 via, for example, Internet 19.

Measuring unit 2 is, as in FIG. 4 and FIG. 5, a unit having sensor array (one example of a magnetic detecting part) 21 which detects magnetic marker 10 and IMU (Inertial Measurement Unit) for achieving inertial navigation integrated together. Measuring unit 2 having a narrow rod shape is attached to, for example, the inside of the front bumper of vehicle 5 or the like, in a state of facing road surface 100S and along a vehicle-width direction. In the case of vehicle 5 of the present embodiment, attachment height of measuring unit 2 with reference to road surface 100S is 200 mm. Note that tag reader 34 may be integrally incorporated into measuring unit 2.

Sensor array 21 includes fifteen magnetic sensors Cn (n is an integer of 1 to 15, one example of a magnetic detecting part) arrayed on a straight line and detection processing circuit 212 having a CPU and so forth not depicted incorporated therein. In sensor array 21, fifteen magnetic sensors Cn are equidistantly arranged with 10-centimeter pitches. Magnetic sensors Cn are sensors which detect magnetism by using the known MI effect (Magneto Impedance Effect) in which impedance of a magneto-sensitive body such as an amorphous wire sensitively changes in response to an external magnetic field.

Detection processing circuit 212 (FIG. 5) of sensor array 21 is an arithmetic circuit which performs marker detection process for detecting magnetic marker 10, and so forth. This detection processing circuit 212 is configured by using a CPU (central processing unit) which performs various calculations as well as memory elements such as a ROM (read only memory) and a RAM (random access memory), and so forth. Detection processing circuit 212 acquires a sensor signal outputted from each of magnetic sensors Cn in a frequency of 3 kHz to perform the marker detection process, and then inputs the detection result to control unit 32.

IMU 22 incorporated in measuring unit 2 is an inertial navigation unit which estimates a relative position of vehicle 5 by inertial navigation. IMU 22 includes biaxial magnetic sensor 221 as an electronic compass which measures an azimuth, biaxial acceleration sensor 222 which measures acceleration, and biaxial gyro sensor 223 which measures angular velocity. Using the measured acceleration, the measured angular velocity, and so forth, IMU 22 calculates a relative position with respect to a vehicle position as a reference.

Tag reader 34 (FIG. 5) included in vehicle 5 is a unit which wirelessly communicates with RFID tag 15 (FIG. 3) arranged on a surface of magnetic marker 10. Tag reader 34 wirelessly transmits electric power required for operation of RFID tag 15, and receives information transmitted from RFID tag 15. Note that transmission information of RFID tag 15 includes the tag ID, which is identification information of RFID tag 15.

Control unit 32 (FIG. 5) included in vehicle 5 is a unit which controls measuring unit 2 and tag reader 34. Control unit 32 exchanges various information with server apparatus 11 via the communication unit. Control unit 32 includes an electronic substrate (omitted in the drawing) having implemented thereon a CPU which performs various calculations, as well as memory elements such as a ROM and a RAM, and so forth.

Control unit 32 uploads detection information of magnetic marker 10 to server apparatus 11 and, in response to uploading the detection information, receives a reply of marker position information from server apparatus 11. The marker position information is information including marker position data indicating a position of magnetic marker 10. The detection information to be uploaded by control unit 32 includes a marker ID (marker identifying information, identification information) which can uniquely identify magnetic marker 10, a vehicle ID as vehicle's identification information, and so forth. Note in a configuration of the present embodiment that the tag ID read from RFID tag 15 when magnetic marker 10 is detected is used as the marker ID.

Control unit 32 (FIG. 5) identifies its own vehicle position by using the marker position information received from server apparatus 11. When magnetic marker 10 is detected, server apparatus 11 takes a position indicated by the marker position information as a reference and identifies a position shifted by a lateral shift amount of vehicle 5 with respect to magnetic marker 10 as its own vehicle position. On the other hand, after magnetic marker 10 is detected and until new magnetic marker 10 is detected, a new own vehicle position is identified by using inertial navigation. Specifically, server apparatus 11 estimates the relative position of vehicle 5 by inertial navigation by taking the most recent own vehicle position as a reference. Then, the server apparatus identifies a position shifted by this relative position from the most recent own vehicle position as the new own vehicle position. Control unit 32 inputs the own vehicle position to navigation device 6 which performs, for example, route guidance to the destination and so forth. Note that navigation device 6 stores map data and can map its own vehicle position on an electronic map based on the map data.

(3) Server Apparatus

Server apparatus 11 is an arithmetic processing apparatus having main circuit 110 which includes an electronic substrate, not depicted, having implemented thereon a CPU, and so forth. In server apparatus 11, storage device 11M such as a hard disk is connected to main circuit 110. Main circuit 110 includes a communication machine supporting a LAN (Local Area Network) not depicted. Server apparatus 11 can be connected to the public communication line such as Internet 19 (FIG. 1) via a communication cable connected to a LAN port.

Connected to main circuit 110 are detection information acquiring part 116 which acquires detection information of magnetic marker 10 from vehicle 5, position information providing part 118 which provides marker position information to vehicle 5 as a transmission source of the detection information, and so forth. Also, main circuit 110 includes functions such as state estimating part 11A which estimates a state of magnetic marker 10 and maintenance information generating part 11B which generates maintenance information indicating a maintenance work required for magnetic marker 10. These functions are achieved by processing a software program by the CPU or the like.

Server apparatus 11 is provided with marker database (marker DB) 111 using a storage area of storage device 11M connected to main circuit 110 to store data regarding magnetic markers 10. Stored in marker DB 111 forming one example of a storage part are installation data (FIG. 7) of magnetic markers 10, operation data (FIG. 8) of magnetic markers 10, state data (FIG. 9) of magnetic markers 10, and so forth.

The installation data of FIG. 7 includes marker position data indicating positions where magnetic markers 10 are installed, flag data indicating a road type as a type of the road, and so forth. To the marker position data or the like of each magnetic marker 10, the marker ID (marker identifying information), which is identification information of magnetic marker 10, is linked. Note that the road type of the present embodiment indicates a road classification based on the degree of volume of traffic. For example, magnetic markers 10 having the road type such as "road type 2" in common have a similar number of vehicles passing thereover.

The operation data of FIG. 8 is data indicating an operation status of each magnetic marker 10 such as a marker-detected count of magnetic marker 10, and has the marker ID linked thereto. The marker-detected count, which is an index indicating an operation status of magnetic marker 10, is the number of times when magnetic marker 10 is detected by vehicle 5. This operation data is managed daily for each road type. For example, FIG. 8 depicts part of daily operation data regarding road type 1. Based on the operation data, a daily marker-detected count of each magnetic marker 10 can be grasped. Furthermore, the operation data is stored so as to be manageable for each road type in marker DB 111 forming one example of the storage part. Based on the operation data managed for each road type, statistical process on the marker-detected count of magnetic marker 10 can be performed for each road type.

The state data of FIG. 9 is flag data indicating a quality level (one example of a state) of magnetic marker 10. To this state data, the marker ID is linked. In the example of FIG. 9, as flag data indicating the quality level of magnetic marker 10, three types of data are presented, for example, corresponding to a circle, a triangle, and a cross. The circle represents flag data indicating a good state with a low degree of possibility of trouble. The cross represents flag data with a high possibility of trouble, indicating that maintenance work is required. The triangle represents flag data indicating that maintenance work is not immediately required to be performed but there is a possibility of trouble and monitoring is required. The state data of FIG. 9 can be used as original data of maintenance information indicating whether to require maintenance work on each magnetic marker 10.

(4) Operation of Magnetic Marker System

Details of operation of magnetic marker system 1 configured as described above are described. First, with reference to FIG. 10 and FIG. 11, (a) marker detection process by vehicle 5 is described. Subsequently, with reference to the flow diagram of FIG. 12, (b) detection information uploading process by vehicle 5 and (c) marker position information transmission process by server apparatus 11 are descried. Furthermore, (d) magnetic marker maintenance information generation process is described.

(a) Marker Detection Process

While vehicle 5 is traveling on the road, sensor array 21 (FIG. 5) of measuring unit 2 repeatedly performs marker detection process for detecting magnetic marker 10.

As described above, magnetic sensors Cn can measure magnetic components in a forwarding direction and the vehicle-width direction of vehicle 5. For example, when these magnetic sensors Cn move in the forwarding direction to pass directly above magnetic marker 10, a magnetic measurement value in the forwarding direction has its sign reversed before and after passing magnetic marker 10 as in FIG. 10 and changes so as to cross zero at a position directly above magnetic marker 10. Therefore, during traveling of vehicle 5, when zero-cross Zc occurs in which the sign of the magnetic measurement value in the forwarding direction detected by any magnetic sensor Cn is reversed, it can be determined that measuring unit 2 is positioned directly above magnetic marker 10. Detection processing circuit 212 (FIG. 5) determines that magnetic marker 10 is detected when zero-cross Zc of the magnetic measurement value in the forwarding direction occurs.

Also, for example, as for a magnetic sensor with the same specification as that of magnetic sensors Cn, assume movement along a virtual line in the vehicle-width direction passing directly above magnetic marker 10. In this case, the magnetic measurement value in the vehicle-width direction has its sign reversed on both sides across magnetic marker 10 and changes so as to cross zero at the position directly above magnetic marker 10. In the case of measuring unit 2 having fifteen magnetic sensors Cn arrayed in the vehicle-width direction, the sign of the magnetic measurement value in the vehicle-width direction to be detected by magnetic sensor Cn varies depending on which side the unit is present with respect to magnetic marker 10, as in the example of FIG. 11.

Based on a distribution curve of FIG. 11 exemplarily depicting magnetic measurement values in the vehicle-width direction of respective magnetic sensors Cn of measuring unit 2, it is possible to identify the position of magnetic marker 10 in the vehicle-width direction by using zero-cross Zc where the sign of the magnetic measurement value in the vehicle-width direction is reversed. When zero-cross Zc is positioned at an intermediate position (that is not limited to the center) between adjacent two magnetic sensors Cn, an intermediate position between the adjacent two magnetic sensors Cn across zero-cross Zc is the position of magnetic marker 10 in the vehicle-width direction. Alternatively, when zero-cross Zc matches the position of any magnetic sensor Cn, that is, when magnetic sensor Cn is present where the magnetic measurement value in the vehicle-width direction is zero and the signs of the magnetic measurement values of magnetic sensors Cn on both outer sides are reversed, a position directly below that magnetic sensor Cn is the position of magnetic marker 10 in the vehicle-width direction. Detection processing circuit 212 measures a deviation of the position of magnetic marker 10 in the vehicle-width direction with respect to the center position (position of magnetic sensor C8) of measuring unit 2 as the lateral shift amount of vehicle 5 with respect to magnetic marker 10. For example, in the case of FIG. 11, the position of zero-cross Zc is a position corresponding to C9.5 in the neighborhood of a midpoint between C9 and C10. As described above, since the pitch between magnetic sensors C9 and C10 is 10 cm, the lateral shift amount of vehicle 5 with respect to magnetic marker 10 is (9.5−8)×10=15 cm with reference to C8 positioned at the center of measuring unit 2 in the vehicle-width direction.

(b) Detection Information Uploading Process

As in FIG. 12, when sensor array 21 of vehicle 5 performs marker detection process P1 described above and detects magnetic marker 10 (S101: YES), tag reader 34 performs tag ID reading process for reading the tag ID of RFID tag 15 (S102). Tag reader 34 wirelessly transmits electric power required for operation of RFID tag 15 to start operation of RFID tag 15, and receives transmission data (such as the tag ID) of RFID tag 15. Then, tag reader 34 inputs the tag ID read by this tag ID reading process to control unit 32. Control unit 32 handles this tag ID as the marker ID as marker identifying information, and generates detection information including this marker ID (S103). Then, control unit 32 links the vehicle ID as identification information of vehicle 5 to the detection information and transmits the detection information to server apparatus 11.

(c) Marker Position Information Transmission Process

Server apparatus 11, as in FIG. 12, when acquiring the detection information from the vehicle 5 side (S201), refers to marker DB 111 (FIG. 6) which stores the marker position data of each magnetic marker 10 and so forth (S202) and then, from the inside of marker DB 111, selects magnetic marker 10 corresponding to the detection information, that is, magnetic marker 10 regarding the marker ID of the detection information.

Server apparatus 11 refers to the installation data (FIG. 7) in marker DB 111 and acquires the marker position data and so forth of the selected magnetic marker 10 (S203) and, furthermore, refers to the operation data (FIG. 8) in marker DB 111 and increments the marker-detected count (refer to FIG. 8) of the selected magnetic marker 10 by one (S204). Then, the server apparatus generates marker position information including the marker position data acquired at step S203, and transmits the marker position information to vehicle 5 as a transmission source of the detection information acquired at step S201 described above (S205).

Control unit 32 of vehicle 5, when acquiring the marker position information (S104), identifies the vehicle position by taking the position indicated by this marker position information as a reference (S105). Specifically, the control unit performs calculation of shifting from the position of magnetic marker 10 as a reference by the lateral shift amount (one example of the relative position) measured by measuring unit 2 in a manner as described above and obtains the vehicle position. Navigation device 6 handles this vehicle position as the own vehicle position and performs route guidance and so forth.

Note that in a traveling section after magnetic marker 10 is detected and until new magnetic marker 10 is detected (S101: NO), control unit 32 estimates the relative position of vehicle 5 by inertial navigation by taking the vehicle position at the time of most recent magnetic marker detection as a reference position (S112). Specifically, IMU 22 (FIG. 5) incorporated in measuring unit 2 calculates a displacement amount by double integration of acceleration measured by biaxial acceleration sensor 222 and performs calculation of integrating displacement amounts along a forwarding azimuth of vehicle 5 measured by biaxial gyro sensor 223. With this, the relative position of vehicle 5 with reference to the above-described reference position is estimated. Then, a position obtained by moving by this relative position from the reference position is identified as the own vehicle position (S105).

(d) Magnetic marker maintenance information generation process

Server apparatus 11 performs statistical process for calculating an average value, a standard deviation, or the like (one example of the result of the statistical process) as for the marker-detected count of each magnetic marker 10 (operation data of FIG. 8). Note in the configuration of the present embodiment that reliability of the statistical process is ensured by performing statistical process for each road type with the same degree of the volume of traffic.

For each magnetic marker 10, server apparatus 11 calculates a deviation value of the marker-detected count (one example of the result of the statistical process) and performs threshold process regarding this deviation value. For example, for magnetic marker 10 with its deviation value of the marker-detected count is below a predetermined threshold value, server apparatus 11 determines that the possibility of trouble is high. In this manner, server apparatus 11 generates state data (FIG. 9) indicating the state of each magnetic marker 10. This state data is quality information indicating the quality level of each magnetic marker 10. This state data can be used as original data of maintenance information indicating whether to require maintenance work on each magnetic marker 10. Note in the present embodiment that, as in FIG. 9, two-stage threshold values are set for the deviation value of the marker-detected count described above. And, with the two-stage threshold values, the quality levels of magnetic markers 10 are classified into three stages (circle, triangle, and cross in the drawing).

The state data of FIG. 9 can be used directly as maintenance information. According to the maintenance information based on the state data, it is possible to perform maintenance of magnetic markers 10 by, for example, a road administrator or the like at appropriate timing. For example, as for a magnetic marker with the cross, a determination can be made such as that in which the magnetic marker has a possibility of trouble and urgent maintenance is required. For example, as for a magnetic marker with the triangle, a determination can be made such as that in which maintenance is required in the next few days. Note that the state data of FIG. 9 may be processed. For example, as for magnetic marker 10 with its quality indicated by the circle, it is possible, for example, as maintenance information, to convert or process the state data to character information such as "a good state is being kept". Also, for example, as for magnetic marker 10 with its quality indicated by the cross, it is possible, for example, to convert or process the state data to maintenance information such as "immediate inspection is required".

As described above, in magnetic marker system 1 of the present embodiment, based on the detection information acquired from each vehicle 5, server apparatus 11 can estimate the state of magnetic markers 10. According to this magnetic marker system 1, by using the detection information of magnetic markers 10 from each vehicle 5, it is possible to efficiently estimate the state of magnetic markers 10. And, by utilizing the state (for example, quality level) of magnetic markers 10 estimated by this magnetic marker system 1, it is possible to efficiently perform inspection and maintenance of magnetic markers 10.

Note in the present embodiment that statistical process is performed on magnetic markers 10 for each road type to determine the state (quality) of magnetic markers 10. In place of or in addition to this, magnetic markers 10 may be classified into groups for statistical process. Possible examples are a group of magnetic markers 10 belonging to predetermined section before and after passing over target magnetic marker 10 (for example, 20 meters before and after, or the like) and a group of magnetic markers 10 in a predetermined nearby range, for example, within a circle with a radius of 20 meters. This configuration is effective for a road structure in which many branching points and merging points are present. Even if the volume of traffic is positionally varied due to the presence of many branching points and merging points, the state of magnetic markers 10 can be estimated with high accuracy while influence of that variance is suppressed. As the above-described predetermined section, for example, a section of the road with branching points or merging points taken as both ends, or the like may be set. Alternatively, as the above-described predetermined section, a section between adjacent two intersections may be set.

Note that server apparatus 11 may be configured so as to be able to identify the position of vehicle 5 as the transmission source of the detection information on the electronic map with the positions of magnetic markers 10 mapped thereon. With this server apparatus 11, when detection information from each vehicle 5 is acquired, it is possible to identify route R from magnetic marker 10B corresponding to detection information acquired from the same vehicle 5 at the previous time as a starting point to corresponding magnetic marker 10A corresponding to the latest detection information. A function as a determining part which determines whether an undetected magnetic marker is present on this route R is preferably provided to the main circuit of server apparatus 1. Of two pieces of detection information chronologically previously and subsequently acquired from any one of vehicles, when another magnetic marker (for example, a magnetic marker with a reference sign 10C in FIG. 13) is present on route R corresponding to traveling of the vehicle after one chronologically-preceding piece of detection information is outputted and until the other detection information is outputted, this determining part can determine that the magnetic marker is undetected.

When undetected marker 10C was able to be identified as in FIG. 13, for example, in the operation data of FIG. 14, while a passing count and the marker-detected count of magnetic marker 10 corresponding to the detection information are each incremented by one, only the passing count of the undetected marker is preferably incremented by one. According to the operation data of the drawing, a marker-detected ratio can be calculated by dividing the marker-detected count by the passing count for each magnetic marker 10. By performing threshold process regarding the marker-detected ratio, the quality of magnetic marker 10 can be determined. Alternatively, for example, the marker-detected ratio itself may be handled as an index indicating the state of magnetic marker 10. Also, for example, result of applying threshold process to the marker-detected ratio may be taken as the quality information or the maintenance information of magnetic marker 10.

Note in the present embodiment that server apparatus 11 having stored therein map data of the electronic map mapped with magnetic markers 10 is exemplarily described. In place of this, a server apparatus having stored therein data indicating an adjacency relation among magnetic markers 10 may be used. If the adjacency relation among magnetic markers 10 is known, it is possible to determine whether magnetic markers 10 corresponding to two pieces of detection information chronologically previously and subsequently uploaded by same vehicle 5 are adjacent to each other. When magnetic markers 10 corresponding to these two pieces of detection information are not adjacent to each other, magnetic marker 10 positioned in between can be determined as undetected marker 10C.

Second Embodiment

The present embodiment is an example of a system configured based on the magnetic marker system of the first embodiment so that a state of sensor array 21, which is one example of a magnetic detecting part on a vehicle side, can be estimated. Details of this are described with reference to FIG. 5 and FIG. 15 to FIG. 18.

Server apparatus 11 of FIG. 15 includes, in addition to the configuration of the first embodiment, storage part 11F which stores history of detection of magnetic markers 10 from each vehicle 5, route mapping part 11C which maps route R (refer to FIG. 16) where each vehicle 5 is traveling on an electronic map, marker identifying part 11D which identifies magnetic markers 10 on route R, evaluating part 11E which evaluates the state of sensor array 21 on the vehicle 5 side, and sensor information providing part 117 which provides sensor state information indicating the state of sensor array 21 to the vehicle 5 side.

Furthermore, server apparatus 11 includes, in addition to marker DB 111, vehicle database (vehicle DB) 112 for storing data of each vehicle 5. Stored in vehicle DB 112 are operation data (FIG. 17) indicating an operation status of sensor array 21 of each vehicle, state data (FIG. 18) indicating the state of the sensor array of each vehicle, and so forth. Note that to the operation data and the state data stored in the vehicle DB, a vehicle ID, which is vehicle's identification information, is linked.

In server apparatus 11, the positions of magnetic markers 10 can be mapped on the electronic map based on map data (FIG. 16). To each magnetic marker 10 mapped on the electronic map, as indicated by a circle, a triangle, or a cross in the drawing, flag data indicating a quality level, which is one example of the state data of magnetic marker 10, is linked. Here, meaning of the circle, the triangle, and the cross each indicating the quality level of magnetic marker 10 is similar to that of the example of FIG. 9 referred to in the first embodiment. Route mapping part 11C maps route R of each vehicle 5 onto the electronic map (FIG. 16) mapped with magnetic markers 10. On the electronic map, magnetic markers 10 positioned on route R are identified by marker identifying part 11D.

Evaluating part 11E compares history of detection of magnetic marker 10 stored in storage part 11F for target vehicle 5 with magnetic markers 10 positioned on route R of that vehicle 5. With this comparison, evaluating part 11E classifies magnetic markers 10 on route R into one of a detected magnetic marker and a non-detected magnetic marker (non-detected marker). Then, as in the state data of FIG. 17, evaluating part 11E takes a passing count and a marker-detected count in total for each level (circle, triangle, cross) of quality of magnetic marker 10, and calculates a detection ratio by dividing the marker-detected count by the passing count. Evaluating part 11E performs this process for each vehicle 5. In this manner, operation data (the passing count, the marker-detected count, and the detection ratio) for each vehicle 5 taken or calculated by evaluating part 11E is stored in vehicle DB 112 (FIG. 15).

Evaluating part 11E further determines the state of sensor array 21 included in each vehicle 5. Evaluating part 11E performs threshold process on, for example, the detection ratio of magnetic markers 10. For example, threshold values may be set to the detection ratios of magnetic markers 10 with quality levels indicated by circles and triangles (FIG. 17). Magnitudes of the threshold values are preferably such that, for example, (threshold value of the detection ratio of magnetic markers with qualities indicated by circles)> (threshold value of the detection ratio of magnetic markers with qualities indicated by triangles). For example, if at least any of magnetic markers 10 with quality levels indicated by circles and triangles has a detection ratio below the threshold value, evaluating part 11E determines that there is a possibility of occurrence of trouble in sensor array 21, and determines that sensor array 21 is in a state requiring inspection. Then, evaluating part 11E generates, as in FIG. 18, flag data indicating whether to require inspection as state data. Note that, in place of the above, threshold process on the detection ratio may be performed only on, for example, magnetic markers 10 with a quality level indicated by the circle.

Sensor information providing part 117 transmits, to vehicle 5 corresponding to sensor array 21 determined to require inspection based on the state data of FIG. 18, caution information indicating as such. This caution information, which is one example of sensor state information, is displayed on, for example, a liquid-crystal display or the like included in a vehicle. This display allows a driver to grasp the caution information and the driver can take measures such as carrying the vehicle into a vehicle's dealer for repairment, inspection, and so forth.

Note that other configurations and operations and effects are similar to those of the first embodiment.

Third Embodiment

The present embodiment is an example in which, based on the magnetic marker system of the second embodiment, a function of generating vehicle information regarding ground clearance of a vehicle is added. Details of this are described with reference to FIG. 19 to FIG. 21.

Server apparatus 11 of FIG. 19 is an apparatus in which, based on the server apparatus of the second embodiment, vehicle information generating part 11G which generates vehicle information and vehicle information providing part 119 which provides this vehicle information to a vehicle side are added. Also, in the magnetic marker system of the present embodiment, a magnetic measurement value (peak value) when a magnetic marker is detected is added to detection information uploaded by the vehicle.

To estimate a state of the magnetic marker, server apparatus 11 of the present embodiment evaluates the degree of magnetic intensity with any of ten-stage magnetic levels. Server apparatus 11 calculates an average value of magnetic measurement values (peak values) included in the detection information acquired from each vehicle side, and allocates magnitude of that average value to any of ten-stage magnetic levels (refer to FIG. 20). This magnetic level can be used as an index indicating the state of the magnetic marker.

Evaluating part 11E of server apparatus 11 makes an evaluation similar to that of the second embodiment for the sensor array (magnetic detecting part) of each vehicle, and also calculates, for each vehicle, an index value indicating a correlation between the magnetic level of the magnetic marker (FIG. 20) and the magnetic measurement value (peak value). Details of process internally performed by evaluating part 11E can be described by using, for example, a graph of FIG. 21. The graph of the drawing represents a relation between the magnetic measurement value (peak value) included in detection information uploaded by a target vehicle and the magnetic level of the corresponding magnetic marker (FIG. 20). The horizontal axis of the graph of the drawing represents ten-stage magnetic levels of the magnetic markers, and the vertical axis represents magnetic measurement values (peak values). On the graph of FIG. 21, pieces of detection information uploaded by a target specific vehicle are sequentially plotted. Evaluating part 11E calculates, for a plotted point group, an approximate straight line by, for example, the least square method. Then, a gradient (coefficient) or an intercept of this approximate straight line can become the index value indicating the above-described correlation. Note that the intercept is the magnetic measurement value at a point where the approximate straight line crosses the vertical axis.

Evaluating part 11E sets a predetermined time, for example, one hour, two hours, one day, one week, or the like, and calculates approximate straight lines (for example, AP1 to AP3) of plotted point groups (for example, D1 to D3) for each predetermined time. For example, when the predetermined time is one hour, the approximate straight line is calculated for every one hour. For example, if sensitivity of magnetic sensors (magnetic detecting part) of the sensor array is not changed and mount height of the sensor array is not changed, the gradient and the intercept of the above-described approximate straight lines (for example, AP1 to AP3) are approximately constant with time. On the other hand, if the sensitivity of the magnetic sensors is not changed but a change occurs in the mount height of the sensor array, the gradient and so forth of the above-described approximate straight lines are changed with time.

With this temporal change being detected, evaluating part 11E can detect a change in ground clearance of the vehicle. With the change in ground clearance of the vehicle being detected, evaluating part 11E can detect, for example, a flat tire, overloading of loads, or the like, which is a cause for the change in ground clearance of the vehicle. When threshold process is performed regarding temporal changes of the gradient and so forth of the above-described approximate straight lines and a change exceeding the threshold value occurs, server apparatus 11 may generate vehicle information indicating that the change in ground clearance of the vehicle is large. In this case, server apparatus 11 may transmit this vehicle information to a corresponding vehicle to encourage caution. For example, if the vehicle information is presented to a passenger by using a display device, a loudspeaker, or the like, an occurrence of an accident due to the flat tire or overloading of loads can be prevented before it happens.

For example, a case in which a transition is made from point group D1→point group D2 is a case in which a change of the intercept hardly occurs but the gradient of the approximate straight line increases. In this case, the cause can be assumed such that the ground clearance of the vehicle is lowered due to, for example, overloading, the flat tire, or the like. With the ground clearance of the vehicle lowered, the mount height of the sensor array (magnetic sensors) is lowered, thereby increasing the magnetic measurement value (peak value) when the sensor array (magnetic sensors) detects the magnetic marker. In this case, vehicle information generating part 11G generates vehicle information indicating that the ground clearance of the vehicle is lowered due to overloading, the flat tire, or the like.

Vehicle information providing part 119 preferably provides that vehicle information to the vehicle side. The vehicle side as a destination may be the corresponding vehicle or the vehicle's dealer which carries out maintenance of the corresponding vehicle. Furthermore, when the corresponding vehicle is a business vehicle such as a taxi or a truck, the vehicle side may be a responsible section of an enterprise or a company which manages the business vehicle. As a method of providing the vehicle information to the vehicle's dealer or the responsible section, there is a method of, for example, transmitting the vehicle information to a terminal device installed at the vehicle's dealer or the like by using a public communication line such as the Internet.

For example, a case in which a transition is made from point group D1→point group D3 is a case in which a change of the gradient of the approximate straight line is less but the intercept has been changed in a manner such that approximate straight line AP1 makes an upward translational movement to become approximate straight line AP3. In this case, there is a possibility that the sensitivity of the magnetic sensors has been changed and also there is a possibility that a change has occurred in the ground clearance of the vehicle. As with the case of the transition from point group D1→point group D2, vehicle information indicating that there is a possibility that a change has occurred in the ground clearance of the vehicle is preferably provided to the vehicle side.

Note that a relation between a change in gradient and intercept of an approximate straight line of a point group or a change in distribution mode of a point group and a cause of occurrence may be subjected to machine learning or the like. According to this machine learning, the cause of occurrence can be estimated by an artificial-intelligence-like scheme. In this case, vehicle information indicating the cause of occurrence is preferably provided to the vehicle side.

Note that other configurations and operations and effects are similar to those of the second embodiment.

In the foregoing, specific examples of the present invention are described in detail as in the embodiment, these specific examples merely disclose examples of technology included in the scope of the claims. Needless to say, the scope of the claims should not be restrictively construed based on the configuration, numerical values, and so forth of the specific examples. The scope of the claims includes technology acquired by variously modifying, changing, or combining as appropriate the above-described specific examples by using known techniques, knowledge of a person skilled in the art, and so forth.

REFERENCE SIGNS LIST 1 magnetic marker system
10 magnetic marker
11 server apparatus
11A state estimating part
11B maintenance information generating part
11C route mapping part
11D marker identifying part
11E evaluating part
11F storage part
11G vehicle information generating part
111 marker database (marker DB)
112 vehicle database (vehicle DB)
116 detection information acquiring part
117 sensor information providing part
118 position information providing part
119 vehicle information providing part
15 RFID tag (wireless tag)
2 measuring unit
21 sensor array (magnetic detecting part)
212 detection processing circuit
32 control unit
34 tag reader
5 vehicle
6 navigation apparatus
Cn (n is 1 to 15) magnetic sensor (magnetic detecting part)

The invention claimed is:

1. A magnetic marker system including a plurality of magnetic markers laid in or on a traveling road so as to be detectable by a magnetic detecting part attached to a vehicle, the system comprising:
 a plurality of the vehicles each of which outputs, when detecting a magnetic marker of the plurality of magnetic markers, detection information including marker identifying information configured to uniquely identifying the magnetic marker; and
 a server apparatus which acquires the detection information outputted from each of the plurality of the vehicles, wherein
 the server apparatus includes a state estimating part which estimates a state of the magnetic marker based on a plurality of the marker identifying information configured to uniquely identifying the magnetic marker acquired from the plurality of the vehicles.

2. The magnetic marker system in claim 1, wherein the state estimating part estimates the state of the magnetic marker based on result of statistical process on a marker-detected count which is the number of times when the magnetic marker is detected.

3. The magnetic marker system in claim 1, wherein the server apparatus includes a maintenance information generating part which generates maintenance information indicating maintenance work required for the magnetic marker based on the state of the magnetic marker.

4. The magnetic marker system in claim 1, wherein the magnetic marker holds a wireless tag configured to outputting the marker identifying information, and the detection information, which is outputted by the vehicle when the vehicle detects the magnetic marker, includes the marker identifying information acquired from the wireless tag held by the magnetic marker.

5. The magnetic marker system in claim 4, wherein the wireless tag forms a sheet shape and is disposed on a surface of the magnetic marker.

6. The magnetic marker system in claim 1, wherein the server apparatus has a storage part which stores operation data indicating an operation status of the plurality of magnetic markers and, in the storage part, the operation data is stored so as to be manageable for each group allotted to the plurality of magnetic markers.

7. The magnetic marker system in claim 6, wherein the state estimating part performs statistical process regarding the operation data for the each group and estimates the state of each of the plurality of magnetic markers based on result of the statistical process.

8. The magnetic marker system in claim 1, wherein the server apparatus has a storage part which stores operation data indicating operation status of the plurality of magnetic markers and, in the storage part, the operation data is stored so as to be manageable for each road type in or on which the plurality of magnetic markers are laid.

9. The magnetic marker system in claim 1, wherein only the marker identifying information configured to uniquely identifying the magnetic marker linked to identification information of each of the plurality of the vehicles is sent from the each of the plurality of the vehicles to the server as the detection information, and the state estimating part of the server apparatus estimates the state of the magnetic marker based on the plurality of the marker identifying information configured to uniquely identifying the magnetic marker sent from the plurality of the vehicles.

10. A magnetic marker system including a plurality of magnetic markers laid in or on a traveling road so as to be detectable by a magnetic detecting part attached to a vehicle, the system comprising:
vehicles each of which outputs, when detecting a magnetic marker of the plurality of magnetic markers, detection information including marker identifying information configured to uniquely identifying the magnetic marker; and
a server apparatus which acquires the detection information outputted from each of the vehicles, wherein
the server apparatus includes a state estimating part which estimates a state of the magnetic marker based on a plurality of the detection information regarding the magnetic marker, and wherein
the state estimating part identifies a marker-detected count which is the number of times when the magnetic marker is detected and a passing count which is the number of times when the vehicles pass over the magnetic marker, and estimates the state of the magnetic marker based on a detection ratio obtained by dividing the marker-detected count by the passing count.

11. A magnetic marker system including a plurality of magnetic markers laid in or on a traveling road so as to be detectable by a magnetic detecting part attached to a vehicle, the system comprising:
vehicles each of which outputs, when detecting a magnetic marker of the plurality of magnetic markers, detection information including marker identifying information configured to uniquely identifying the magnetic marker; and
a server apparatus which acquires the detection information outputted from each of the vehicles, wherein
the server apparatus includes a state estimating part which estimates a state of the magnetic marker based on a plurality of the detection information regarding the magnetic marker, and wherein
the state estimating part is configured to estimating the state of the magnetic detecting part based on the state of the plurality of magnetic markers, and
the server apparatus includes a sensor information providing part which provides sensor state information indicating the state of the magnetic detecting part to a vehicle side.

12. The magnetic marker system in claim 11, wherein
the server apparatus includes a marker identifying part which identifies magnetic markers on a route of the vehicle and a storage part which stores detected magnetic markers detected by the vehicle, and
the state estimating part estimates the state of the magnetic detecting part by performing a process of comparing the magnetic markers on the route with the detected magnetic markers.

13. The magnetic marker system in claim 12, wherein
the state estimating part is configured to estimating quality levels of the state of the magnetic markers on the route, and
the state estimating part estimates, in the process of comparing, the state of the magnetic detecting part by using different indexes in accordance with quality levels of the state of the magnetic markers on the route estimated by the state estimating part.

14. The magnetic marker system in claim 11, wherein the server apparatus includes a vehicle information generating part which generates vehicle information indicating a state of the each of the vehicles and a vehicle information providing part which provides the vehicle information to a corresponding vehicle side,
the state estimating part is configured to detecting a change in mount height in the each of the vehicles as the state of the magnetic detecting part, and
the vehicle information generating part detects a change in ground clearance of the each of the vehicles in accordance with the change in mount height of the magnetic detecting part in the each of the vehicles and generates the vehicle information corresponding to the change in ground clearance for the each of the vehicles.

15. The magnetic marker system in claim 14, wherein
the detection information outputted by the each of the vehicles includes a peak value of a magnetic measurement value,
the state estimating part identifies a magnetic level of the magnetic marker based on the plurality of the detection information regarding the magnetic marker, and
the state estimating part detects the change in ground clearance of the vehicle by using an index indicating a correlation between the magnetic level of the magnetic marker and the peak value of a magnetic measurement value of the magnetic marker measured by the magnetic detecting part.

16. A magnetic marker system including a plurality of magnetic markers laid in or on a traveling road so as to be detectable by a magnetic detecting part attached to a vehicle, the system comprising:
vehicles each of which outputs, when detecting a magnetic marker of the plurality of magnetic markers, detection information including marker identifying information configured to uniquely identifying the magnetic marker; and a server apparatus which acquires the detection information outputted from each of the vehicles, wherein the server apparatus includes a state estimating part which estimates a state of the magnetic marker based on a plurality of the detection information regarding the magnetic marker, and wherein the server apparatus has a storage part which stores operation data indicating operation status of the plurality of magnetic markers and, in the storage part, the operation data is stored so as to be manageable for each road type in or on which the plurality of magnetic markers are laid, and wherein the state estimating part performs statistical process regarding the operation data for the each road type and estimates the state of each of the plurality of magnetic markers based on result of the statistical process.

17. A magnetic marker system including a plurality of magnetic markers laid in or on a traveling road so as to be detectable by a magnetic detecting part attached to a vehicle, the system comprising:

vehicles each of which outputs, when detecting a magnetic marker of the plurality of magnetic markers, detection information including marker identifying information configured to uniquely identifying the magnetic marker; and a server apparatus which acquires the detection information outputted from each of the vehicles, wherein the server apparatus includes a state estimating part which estimates a state of the magnetic marker based on a plurality of the detection information regarding the magnetic marker, and wherein the server apparatus includes a determining part which determines, of two pieces of detection information chronologically previously and subsequently acquired from any one vehicle, after one chronologically-preceding piece of detection information is outputted and until another piece of detection information is outputted, whether a magnetic marker not detected by the any one vehicle is present.

\* \* \* \* \*